(12) United States Patent
Rowley

(10) Patent No.: US 6,557,907 B2
(45) Date of Patent: May 6, 2003

(54) POLYETHYLENE CONNECTORS

(76) Inventor: William W. Rowley, 35 Wilding Chase, Chagrin Falls, OH (US) 44022

(*) Notice: Subject to any disclaimer, the term of this patent is extended or adjusted under 35 U.S.C. 154(b) by 0 days.

(21) Appl. No.: 09/751,888

(22) Filed: Dec. 29, 2000

(65) Prior Publication Data

US 2001/0002755 A1 Jun. 7, 2001

Related U.S. Application Data

(63) Continuation-in-part of application No. 09/129,074, filed on Aug. 4, 1998, now abandoned, which is a continuation-in-part of application No. 08/726,317, filed on Oct. 3, 1996, now Pat. No. 5,861,200, which is a continuation-in-part of application No. 08/588,713, filed on Jan. 19, 1996, now Pat. No. 5,622,670, which is a continuation-in-part of application No. 08/327,028, filed on Oct. 21, 1994, now Pat. No. 5,527,503, which is a continuation-in-part of application No. 08/062,848, filed on May 14, 1993, now abandoned.

(51) Int. Cl.$^7$ .................................................. F16L 19/00
(52) U.S. Cl. ................ 285/354; 285/148.19; 285/332; 285/423
(58) Field of Search .................. 285/148.19, 332, 285/354, 423; 138/109, 177; 264/296, 322

(56) References Cited

U.S. PATENT DOCUMENTS

| | | |
|---|---|---|
| 3,013,310 A | 12/1961 | Foster et al. |
| 3,470,900 A | 10/1969 | Rothauser |
| 3,719,209 A | 3/1973 | Rush et al. |
| 3,723,946 A | 3/1973 | Weatherup et al. |
| 3,843,300 A | 10/1974 | McFarlane |
| 3,917,497 A | 11/1975 | Stickler |
| 3,929,958 A | 12/1975 | Parmann |
| 4,005,879 A | 2/1977 | Berger et al. |
| 4,009,982 A | 3/1977 | Maier |
| 4,014,568 A | 3/1977 | Carter et al. |
| 4,039,212 A | 8/1977 | Skarud |
| 4,081,190 A | 3/1978 | Itzler |
| 4,113,813 A | 9/1978 | Wilson |
| 4,135,961 A | 1/1979 | Yoshizawa et al. |
| 4,140,739 A | 2/1979 | Cotton |
| 4,152,817 A | 5/1979 | Cotton |
| 4,175,917 A | 11/1979 | Cotton |
| 4,177,237 A | 12/1979 | Ueno et al. |
| 4,209,597 A | 6/1980 | Bremholt |
| 4,264,490 A | 4/1981 | Berejka |
| 4,264,661 A | 4/1981 | Brandolf |
| 4,266,815 A | 5/1981 | Cross |
| 4,316,870 A | 2/1982 | Rowley |
| 4,342,800 A | 8/1982 | Changani et al. |
| 4,343,800 A | 8/1982 | Kope et al. |
| 4,343,864 A | 8/1982 | Berejka |
| 4,446,084 A | 5/1984 | Rowley |
| 4,525,136 A | 6/1985 | Rowley |
| 4,575,044 A | 3/1986 | Gentry |

(List continued on next page.)

FOREIGN PATENT DOCUMENTS

| | | |
|---|---|---|
| CA | 938932 | 12/1973 |
| DE | 28 38 731 | 3/1980 |
| EP | 033 587 A1 | 8/1981 |
| GB | 750906 | 6/1956 |
| GB | 1172566 | 12/1969 |
| GB | 1421530 | 1/1976 |
| WO | WO 84/01988 | 5/1984 |
| WO | WO 85/03251 | 8/1985 |

Primary Examiner—Lynne H. Browne
Assistant Examiner—James M. Hewitt
(74) Attorney, Agent, or Firm—Buckingham, Doolittle & Burroughs, LLP

(57) ABSTRACT

A one-piece medium density polyethylene connector or polymeric blend of high density with low density polyethylene with the blended characteristics of a medium density polyethylene, is described as an alternative to crosslinked polyethylene connectors for use in applications less physically demanding than those for use with crosslinked polyethylene material.

10 Claims, 11 Drawing Sheets

U.S. PATENT DOCUMENTS

| | | |
|---|---|---|
| 4,614,208 A | 9/1986 | Skarelius |
| 4,664,423 A | 5/1987 | Rowley |
| 4,690,632 A | 9/1987 | Carrow |
| 4,735,442 A * | 4/1988 | Burli .......................... 285/248 |
| 4,783,303 A | 11/1988 | Imgram |
| 4,803,033 A | 2/1989 | Rowley |
| 4,887,852 A | 12/1989 | Hancock |
| 4,991,876 A | 2/1991 | Mulvey |
| 5,364,135 A | 11/1994 | Anderson |
| 5,527,503 A | 6/1996 | Rowley |
| 5,622,670 A | 4/1997 | Rowley |
| 5,833,279 A | 11/1998 | Rowley |
| 5,861,200 A | 1/1999 | Rowley |
| 5,895,695 A * | 4/1999 | Rowley ...................... 138/109 |
| 6,070,916 A * | 6/2000 | Rowley ................. 285/148.19 |
| 6,270,125 B1 * | 8/2001 | Rowley et al. .............. 285/242 |
| 6,287,501 B1 * | 9/2001 | Rowley ...................... 264/254 |

\* cited by examiner

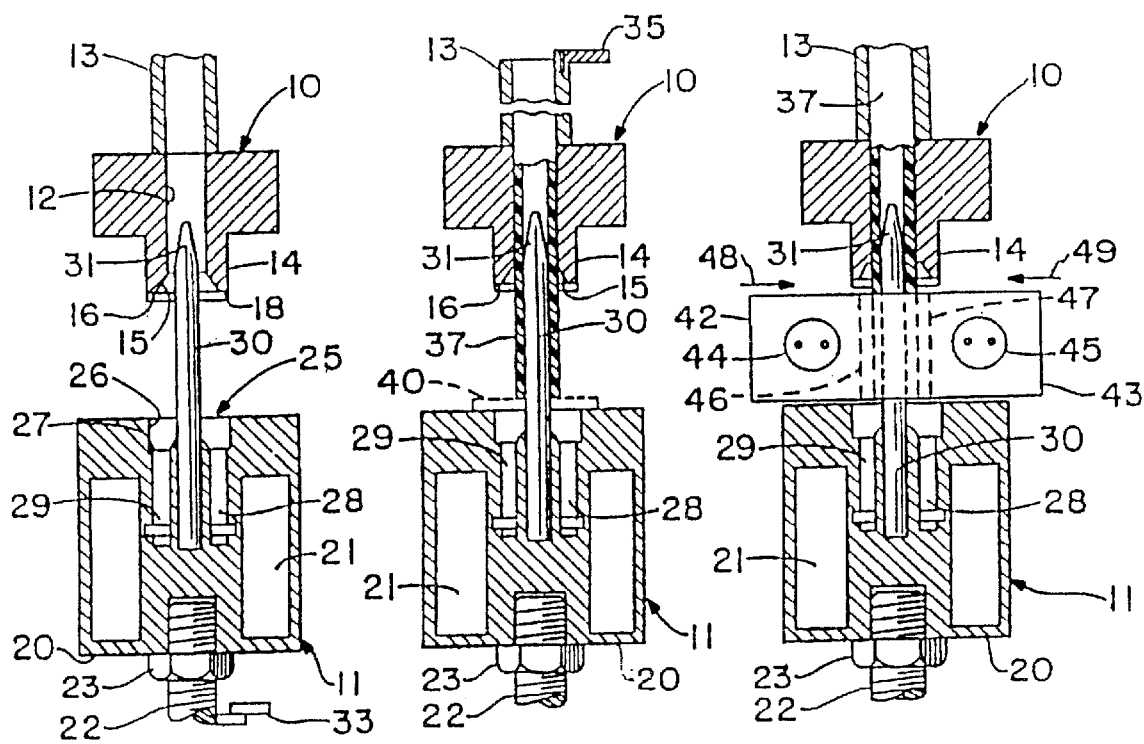
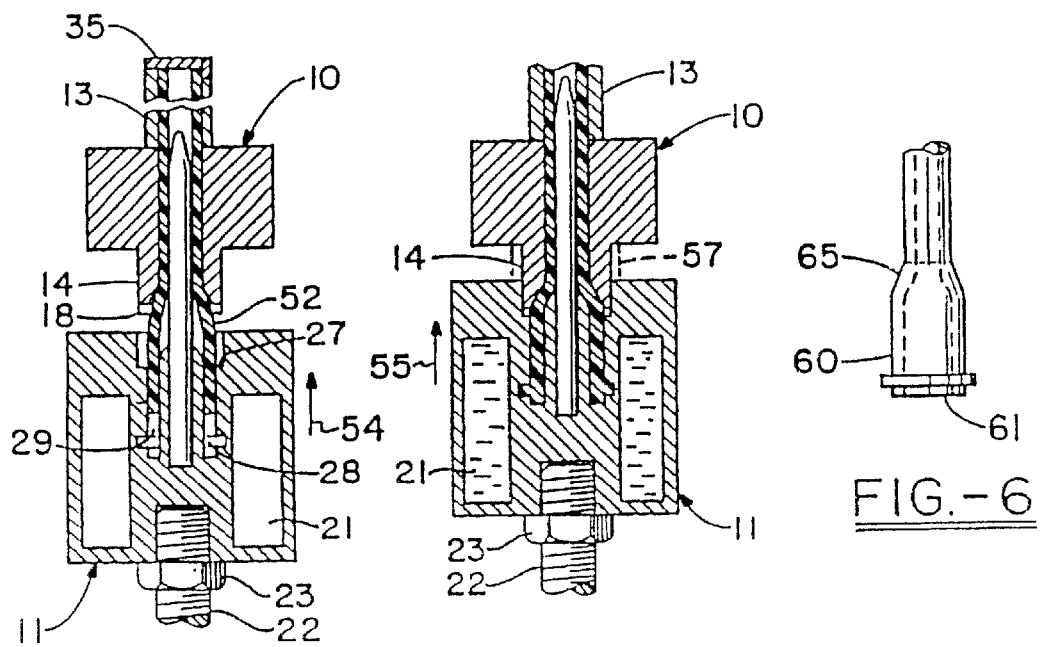

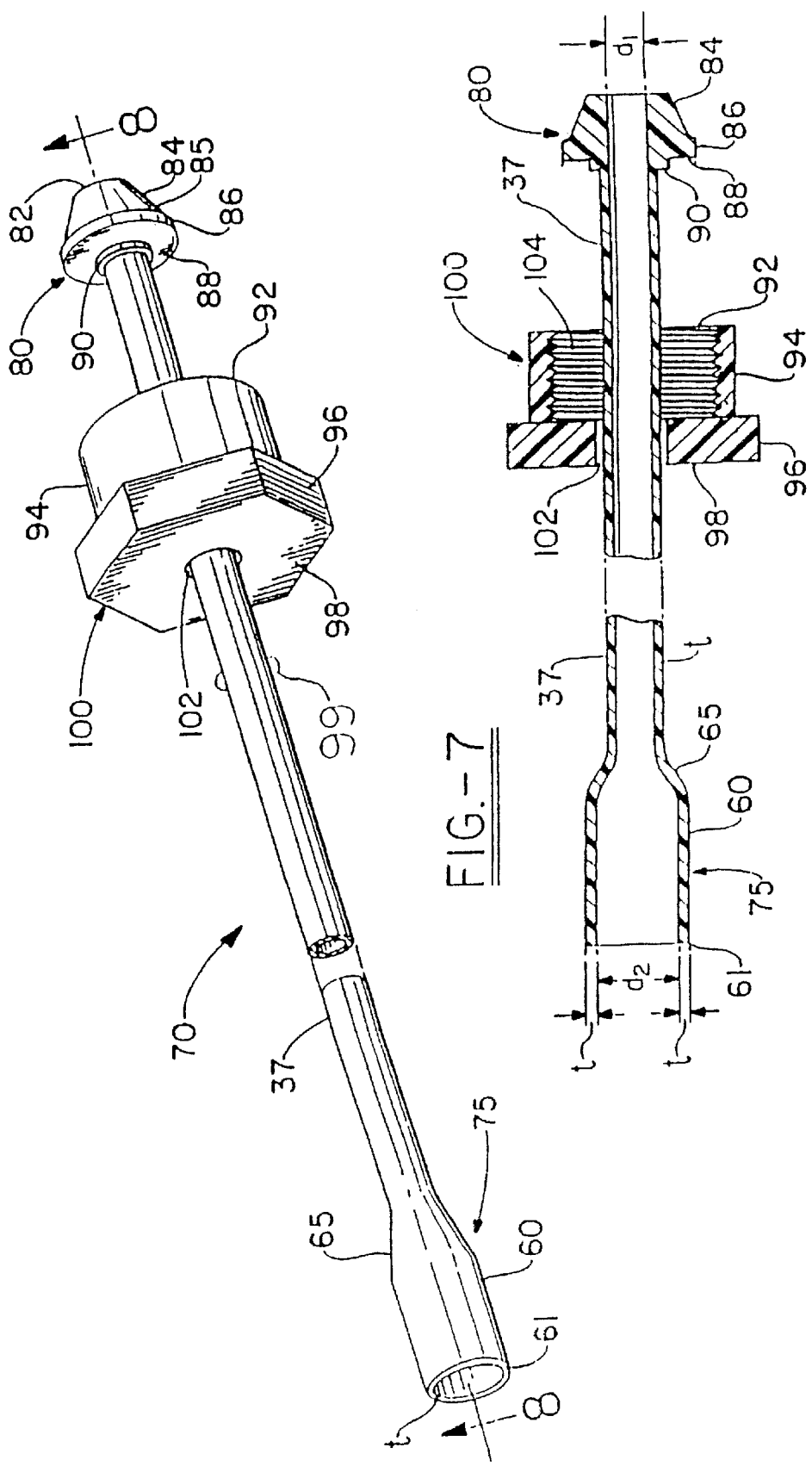

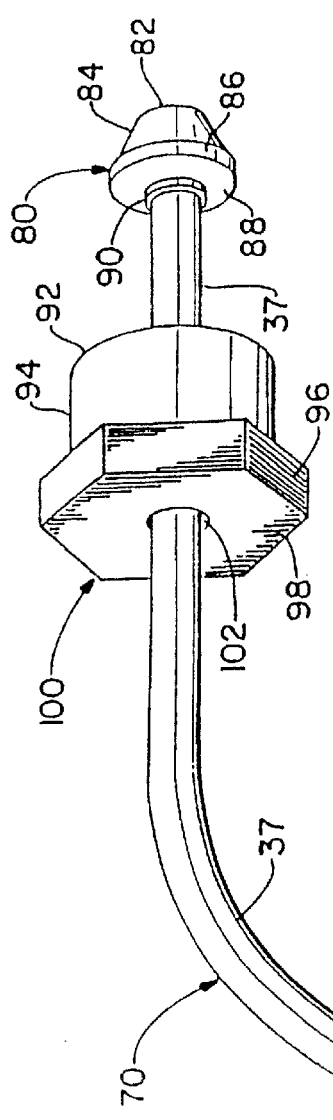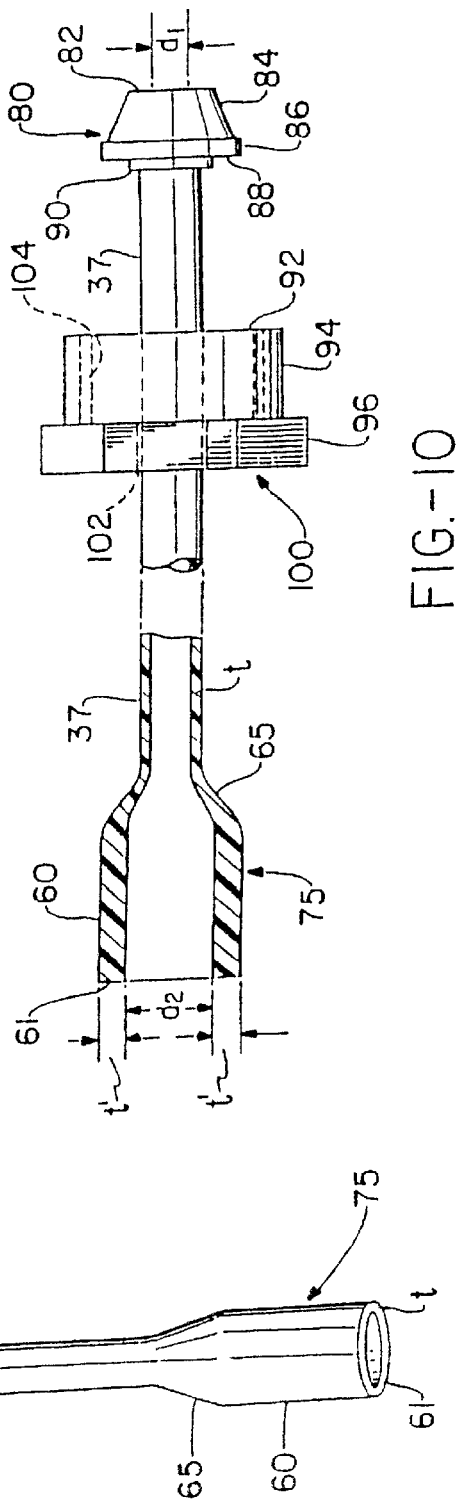

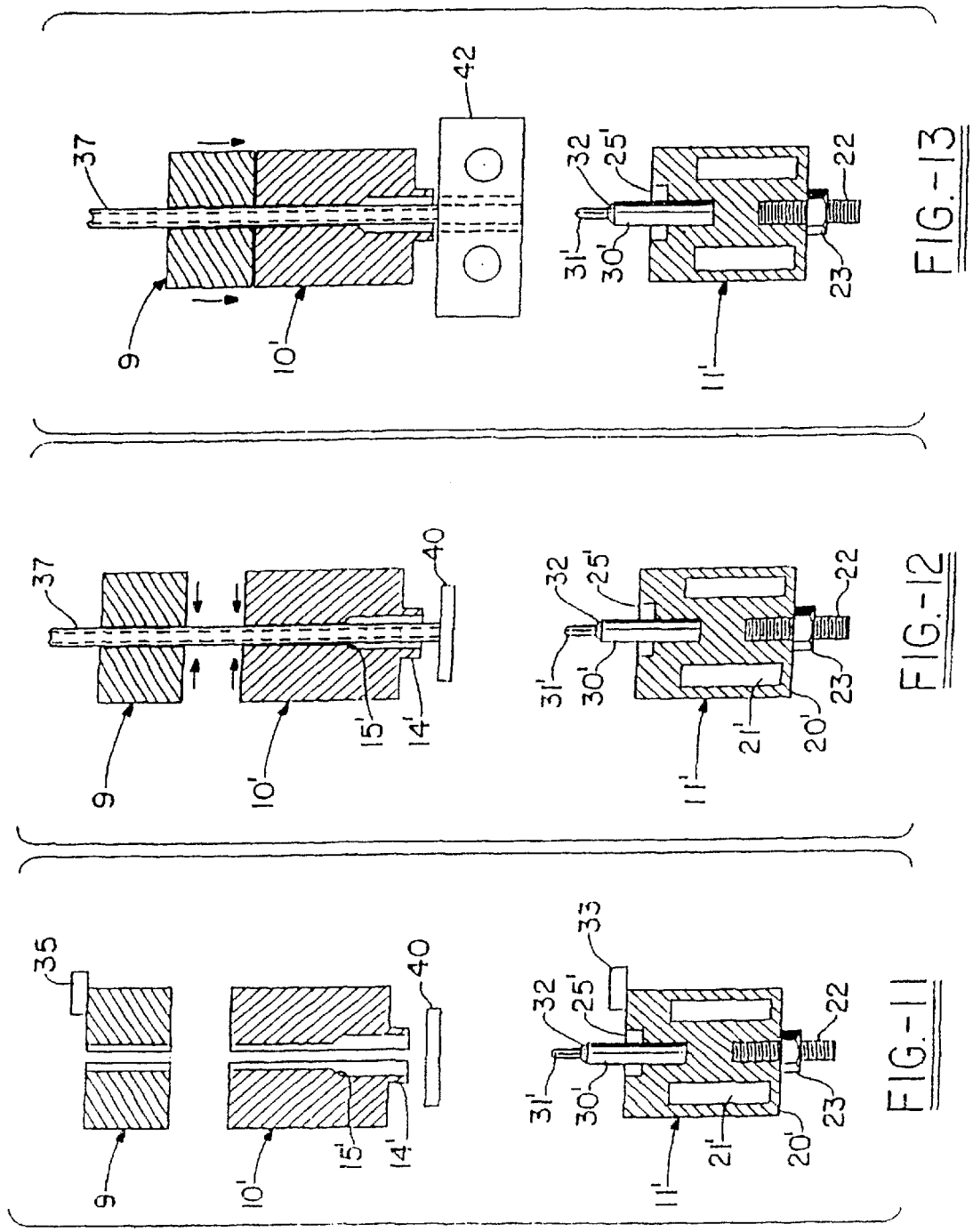

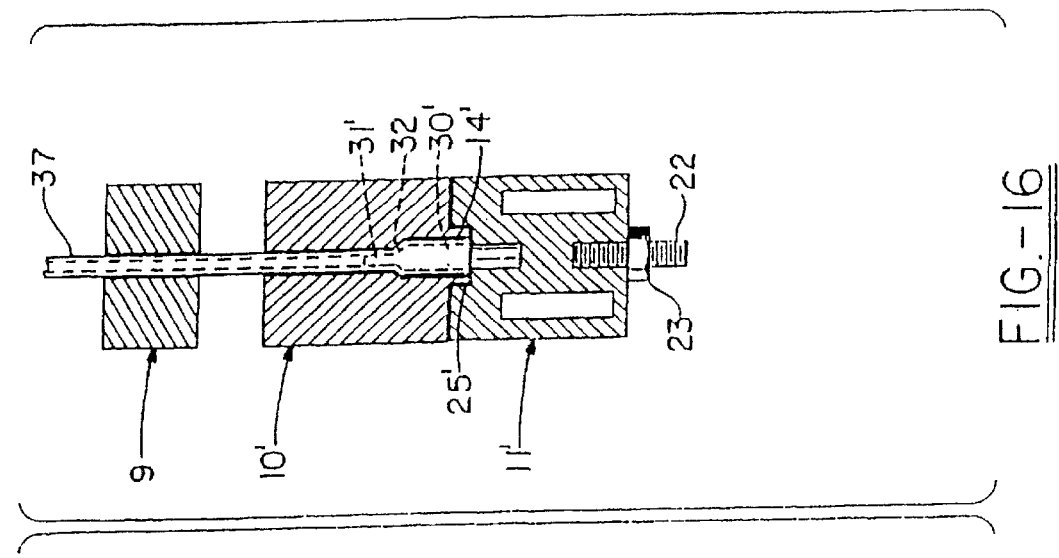
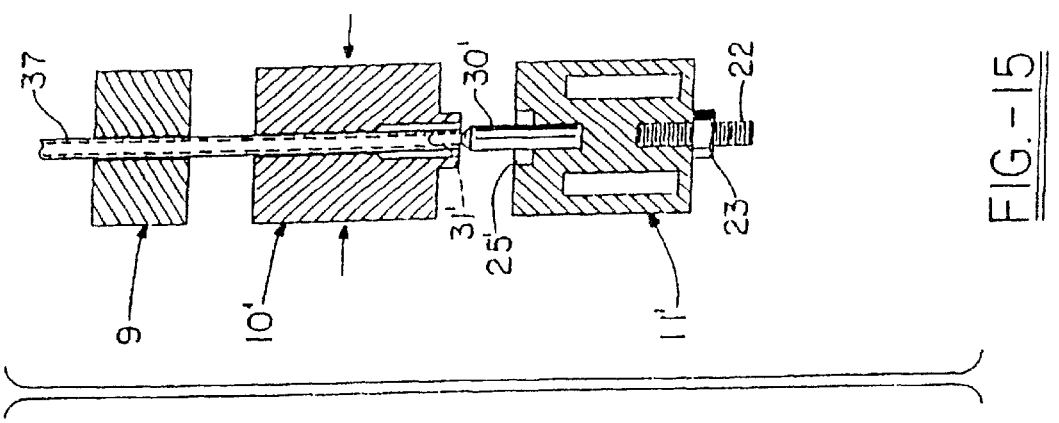
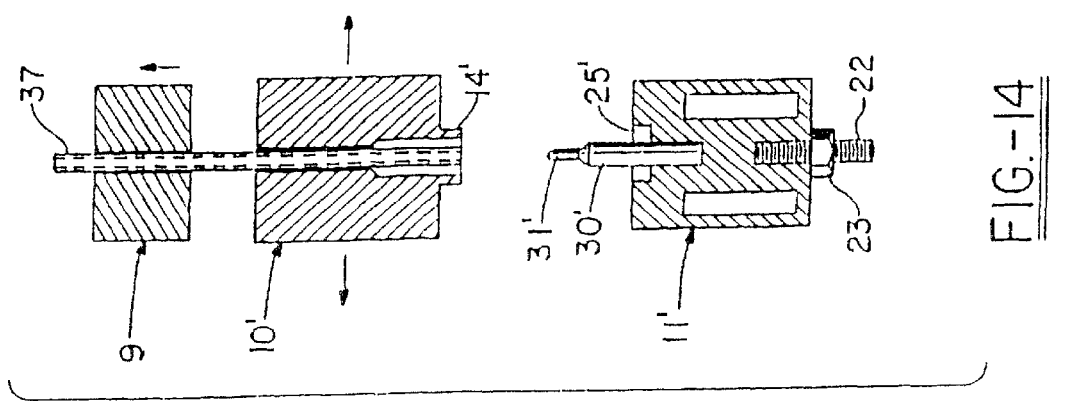

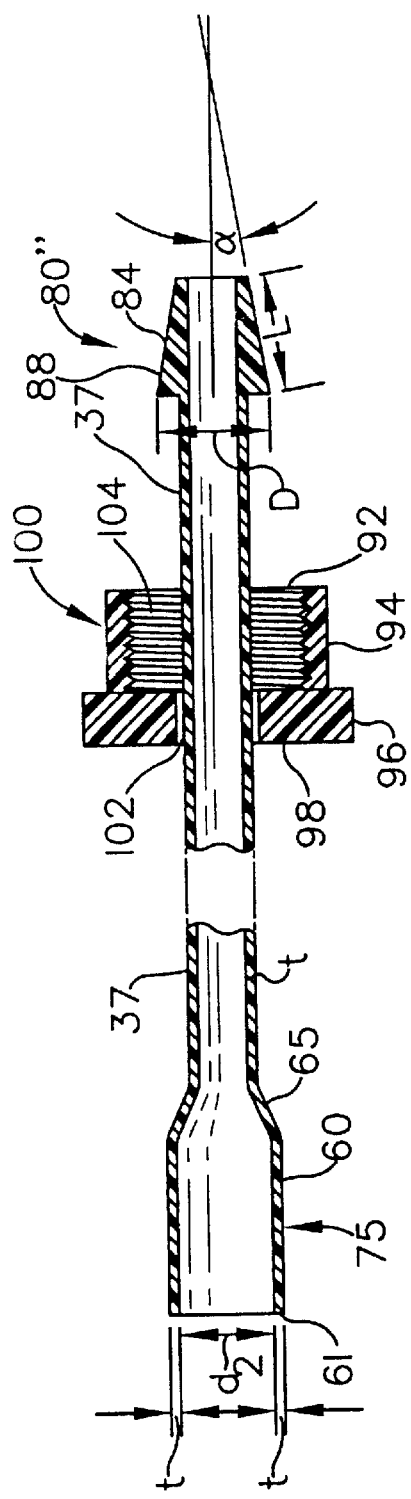
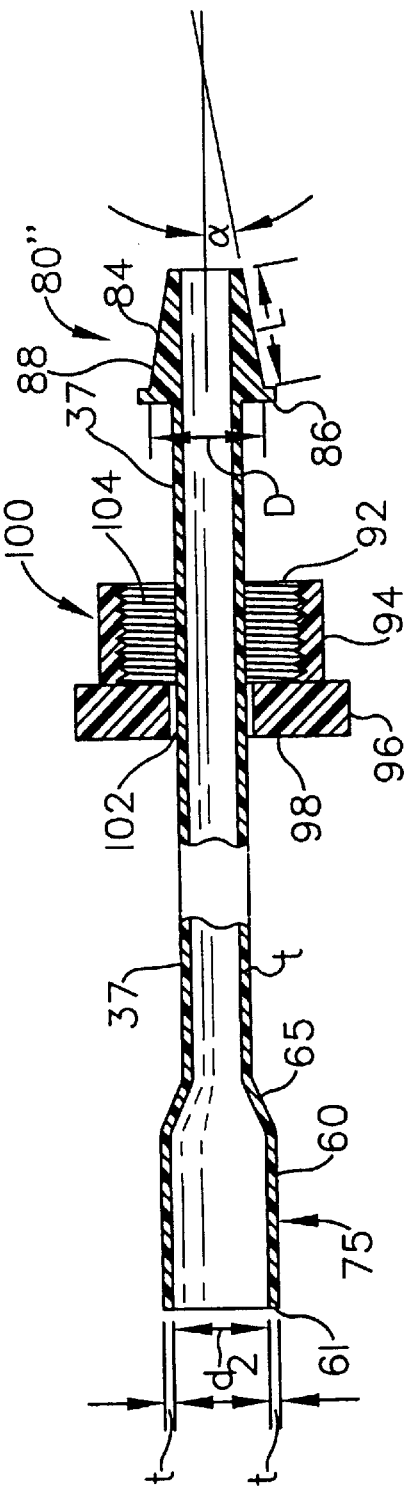
FIG.-27
FIG.-28

POLYETHYLENE CONNECTORS

This application is a continuation-in-part of now abandoned U.S. patent application Ser. No. 09/129,074 filed Aug. 4, 1998, which is a continued prosecution application of U.S. patent application Ser. No. 09/129,074 filed on Aug. 4, 1998, which is a continuation-in-part application of U.S. patent application Ser. No. 08/726,317 filed Oct. 3, 1996, now U.S. Pat. No. 5,861,200, which is a continuation-in-part application of U.S. patent application Ser. No. 08/588,713 filed Jan. 19, 1996, now U.S. Pat. No. 5,622,670, which is a continuation-in-part application of U.S. patent application Ser. No. 08/327,028 filed Oct. 21, 1994, now U.S. Pat. No. 5,527,503 which is a continuation-in-part of U.S. patent application Ser. No. 08/062,848 filed May 14, 1993 now abandoned.

TECHNICAL FIELD

The invention described herein pertains generally to a method for processing plastic tubing ends, particularly those of polyethylene, and more particularly, medium density polyethylene. The method refers generally to belling and reforming tubing ends without compromising wall thickness, thereby enabling the work piece to be suitable for plumbing applications. In one application of this invention, the technology will involve crosslinking to at least a limited degree, i.e., less than 10%, preferably less than 5%, and more preferably, less than 1%. In an alternative embodiment, the technology will eliminate this crosslinking step and result in a tubing end which is more flexible than polypropylene or crosslinked polyethylene, yet which will be suitable for use in low pressure, cold water side applications, and especially adapted for use in refrigeration applications, e.g., ice maker cold water input lines.

BACKGROUND OF THE INVENTION

In plumbing installations, copper tubing is widely employed. In risers, used for connecting tubing to fixtures or tanks, the end of the copper tubing is shaped to form a bulb sealing surface and such bulb includes a shoulder permitting the tubing and thus the bulb sealing surface to be drawn into biting or sealing engagement with the fixture. The cost of such copper tubing and the cost of forming the same to permit the connection to such fixtures or tanks is substantial.

More recently, polybutylene was approved for use in plumbing. Tubing or pipe made of polybutylene is normally joined by heat-fusion techniques, by mechanical compression, and by cold flaring. In order to provide such polybutylene tubing with a bulb sealing surface or an end cap for such purposes, a variety of techniques have been employed. Two commonly employed techniques are: (1) spin welding a separately molded bulb onto the outer diameter (O.D.) of the end of a tube; or (2) insert molding a bulb onto the O.D. of the end of a tube. All such processes have cost and performance drawbacks. Most require separately molded parts which must be joined to the tubing in assembly operations. Moreover, a two-part tubing end cap or bulb sealing construction does not have the performance integrity or the expected useful life of the tubing itself. In the spin welding technique, excessive clamping pressures may cause the loaded part to become dislodged or separated from the O.D. of the tubing and the interface of the parts provides a possibility of leakage. In the case of a neoprene or like washer employed on the O.D. of the tubing, the same interface leakage susceptibility is present. Moreover, a flange formed to receive the washer may itself create a point of weakness if excessive clamping pressures are employed. Further neoprene washers are known to deteriorate with age and temperature exposure. Lastly, insert molding forces hot material over a cold tube surface, which can separate from the tube.

The solution to this problem of providing polybutylene tubing with an attached bulb sealing surface of unitary construction is detailed in U.S. Pat. Nos. 4,316,870, 4,446,084, and 4,525,136. The thrust of these references however is to teach the ability to maintain a constant diameter opening within the tubing, while the wall thickness is variable. This is of necessity, due to the configuration of the mold cavity, and insertion of the mandril inside the tubing during the processing steps.

A corresponding associated problem with the formation of the above-described male end of the polybutylene tubing, is the ability to bell an opposed end of the tubing, without any accompanying wall thickness compromise, which would make the product unsuitable for all plumbing applications, for which polybutylene has been approved, provided that a wall thickness can be maintained at 0.062"±0.010", as defined by ASTM 3309. In particular, it is desirable to use ⅜" O.D. polybutylene tubing with wall thickness of 1/16" (0.062") and subsequently insert a ½" CTS (copper tube size) fitting of nominal 0.501" O.D. The only way this can be achieved is through belling one end of the tubing from ⅜" O.D. (¼" I.D.) to ⅝" O.D. (½" I.D.). While it is possible to use ⅝" O.D. tubing to start, this uses more raw materials than necessary.

Prior art solutions to the formation of a bell on one end of polybutylene tubing is by heating a portion of the end of the tubing, followed by insertion of a mandril into the heated open end, the O.D. of the mandril being matched to the targeted inner diameter of the tubing. While this approach will bell the tubing, it is incapable of reproducibly making tubing products with a constant wall thickness of 0.062"±0.010" throughout the belled end, particularly in the neck region of the bell. This is due to the fact that the bell is made by expanding the I.D. and thus thinning the walls. A solution to this problem is found in U.S. Pat. No. 5,527,503.

More recently, the trend has been to shift from thermoplastic materials, e.g., polypropylene, polybutylene, etc. to thermoset materials, e.g., crosslinked polyethylene. However, this shift in materials is not simple in that there are several processing changes which must be incorporated in order to fabricate acceptable parts. Since thermosets cannot be extruded like thermoplastics, different processing conditions must be employed in different sequences in order to achieve similar functionality for the product. For example, it is not possible to simply take a crosslinked polyethylene tube and mold it into a bulb end by taking the polybutylene technology taught in the prior art. Previously crosslinked material will not chemically bond to itself even when heated to the clear state. This means that the material in the formed ends is not completely sealed upon itself, but rather molded in place with pressure. One prior art solution to this problem is the use of metal inserts which are positioned into crosslinked polyethylene tubes and subsequently crimped in order to achieve a fitting. This is an inherent weak spot in the final product, and the industry has long sought to find a solution to the problem of developing a one-piece plumbing part made out of a thermoset plastic. Solutions to this problem can be found in U.S. Pat. Nos. 5,622,670, 5,833,279 and 6,070,916.

Most recently, with cost playing an increasing role in component fabrication matters, another shift is occurring which capitalizes on the recently acquired knowledge gained from using crosslinked polyethylene and transferring it for use with various grades of polyethylene, previously believed not to be suitable for plumbing applications if not in the crosslinked state. However, it has been recognized that for some applications, the desirable flexibility of polyethylene, particularly medium density polyethylene (MDPE) is highly effective for use with plumbing applications which are not subject to either intense pressure situations or exposed to high temperatures. In yet another variation of this invention, the MDPE is a blend of both high density polyethylene (HDPE) and low density polyethylene (LDPE) to achieve the properties of MDPE.

SUMMARY OF THE INVENTION

In accordance with the present invention, there is provided a method for processing polyethylene polymers which will enable a work piece to have a one-piece formed/shaped ends from a single piece of tubing.

It is an object of this invention to provide a process for belling a tube of initial internal diameter to a larger internal diameter while maintaining at least a constant wall thickness throughout the tubing to produce a belled end.

It is another object of this invention to provide a process for forming a sealing surface shaped end on a tube wherein the shaping results in a thermally bonded end of constant diameter, the part having been formed from a polyethylene tube which achieves the physical properties of MDPE.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 1 is a fragmentary vertical section of the dies employed to form the tubing in accordance with the present invention, such dies being shown separated from each other;

FIG. 2 is a view similar to FIG. 1 showing the tubing inserted through the female die, partially inserted on the male die and projecting a predetermined distance from the former;

FIG. 3 is a view similar to FIGS. 1 and 2 showing the tube projection portion being heated;

FIG. 4 is a view similar to FIGS. 1–3 showing the dies being brought together;

FIG. 5 is a view similar to FIG. 4 showing the dies closed;

FIG. 6 is a fragmentary elevation of the end of the tube as formed by the process depicted in FIGS. 1–5;

FIG. 7 is a perspective view showing the male and female segment of a section of tubing made in accordance with the teachings of this invention, wherein the male segment is an integrally molded bulb and sealing surface and the female segment is shown belled to a larger diameter, the thickness of the tubing being essentially constant throughout, with internally threaded nut shown slightly below the male segment;

FIG. 8 is an enlarged cross-sectional view taken along line 8—8 of FIG. 7;

FIG. 9 is a perspective view showing the tubing of FIG. 7 illustrating a non-linear configuration of the tubing;

FIG. 10 is an enlarged cross-sectional view similar to FIG. 8 illustrating an increased thickness of the tubing in the belled region;

FIG. 11 is a fragmentary vertical section of the dies employed to form the tubing in accordance with the present invention, the dies being shown separated from each other;

FIG. 12 is a view similar to FIG. 11 showing the tubing inserted through the female die, and projecting a predetermined length therefrom;

FIG. 13 is a view similar to FIGS. 11–12 showing the tube projecting portion being heated;

FIG. 14 is a view similar to FIGS. 11–13 showing the clamping die retracting the projecting tubing portion back into the middle die for subsequent belling;

FIG. 15 is a view similar to FIGS. 11–14 showing the dies being brought together;

FIG. 16 is a view similar to FIGS. 11–15 showing the dies closed;

FIG. 27 is an enlarged cross-sectional view of yet another embodiment of the sealing end of the tubing connector, particularly suitable for use with medium density polyethylene; and FIG. 28 is an alternative embodiment of FIG. 27 illustrating a flange.

DETAILED DESCRIPTION OF THE INVENTION

Figure 17:
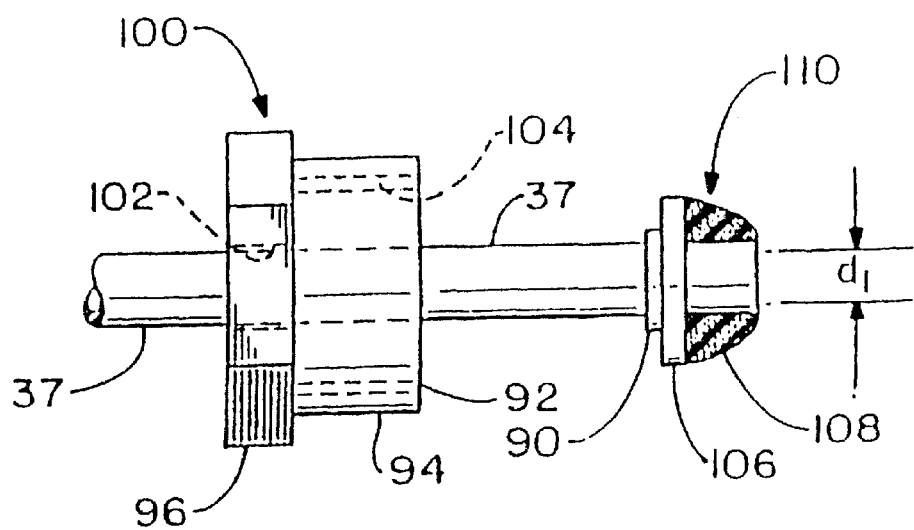
FIG. 17 is a perspective view showing the male and female segments of a section of tubing made in accordance with the teachings of this invention, wherein the male segment is an integrally molded ledge with a soft nose cone sealing surface and the female segment is shown belled to a larger diameter, the thickness of the tubing being constant throughout with internally threaded nut shown slightly below the male segment.

Referring now to the drawings where the showing are for purposes of illustrating the preferred embodiment of the invention only and not for purposes of limiting the same, the Figures show cut lengths of plastic tubing upon which various end configurations have been fabricated onto and wherein the connector is preferably medium density polyethylene, having a density range of from about 0.926 g/cc to 0.940 g/cc inclusive, having a flexural modulus of at least about 110,000, and wherein the connector may be a blend of high and low density polyethylene.

As seen in the Figures, the tubing comprises a top vertically fixed mold 10 and a vertically movable bottom mold 11. The top mold or die 10 includes a central bore 12 and a riser tube 13 secured to the top thereof having an I.D. the same as the I.D. of the bore 12. The lower surface of the top mold is provided with a cylindrical projection 14 projecting centrally therefrom. The lower end of the bore is provided with a conical flaring portion 15, the lower end of which is provided with a small radius seen at 16. Radially beyond such radius, the bore is terminated in an axially extending edge 18.

The bottom mold 11 includes a body 20 which may include an annular passage 21 for the circulation of cooling medium therethrough. The body 20 is threadedly connected to rod 22 of a piston-cylinder assembly and adjustably locked thereto by the nut 23. The top of the mold or die 11 is provided with a central recess shown generally at 25 which includes an upper cylindrical portion 26 into which the axial projection 14 of the top mold is designed closely to telescope. The lower end of the cylindrical portion is provided with a shoulder 27 separating the cylindrical portion of the recess from the circular bulb forming cavity 28a or belling cavity 28. The lower circular bulb forming cavity is provided with a horizontal circular axially facing end face 29 which is selectively larger in diameter than the diameter of the bore 12. Projecting axially from the bottom of the recess 25 is a guide rod 30, the top of which is provided with a pilot nose or pointed portion 31.

Figures 20, 21, 22:
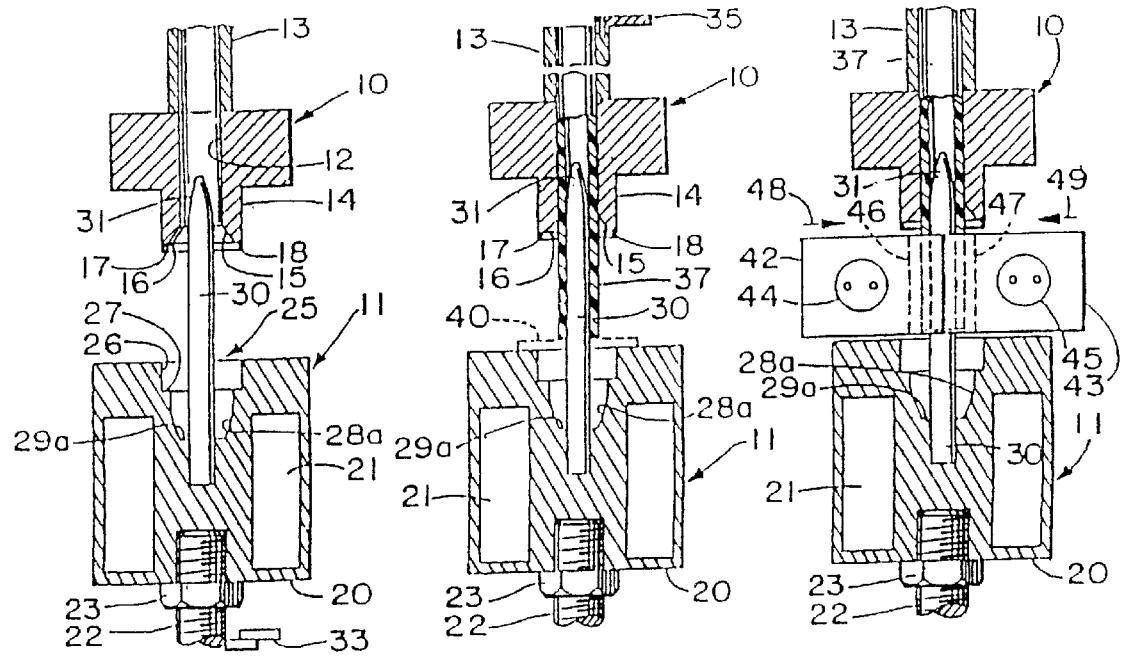
FIG. 20 is a fragmentary vertical section of the dies employed to form the sealing end of the tubing in accordance with the present invention, such dies being shown separated from each other.
FIG. 21 is a view similar to FIG. 20 showing the tubing inserted through the female die, partially inserted on the male die and projecting a predetermined distance from the former.
FIG. 22 is a view similar to FIGS. 20–21 showing the tube projecting portion being heated.

In FIGS. 1 and 20, the top and bottom molds or dies have been brought to an intermediate position relative to each other in that the bottom mold 11 has been brought to an intermediate elevated position and the position may be determined by a retractable adjustable stop as seen at 33 in FIG. 1. In such position, the pilot nose of the guide rod 30 projects into the bore 12 as shown.

Referring to FIGS. 2 and 21, it will be seen that the top of the guide tube 13 is provided with a back stop seen at 35 which may be pivoted to the top of the guide tube 13 for swinging movement to and from a position clear of the I.D. of such tube or over the I.D. of such tube.

A polyolefin plastic tube section, which in a preferred embodiment, is not crosslinked, cut to a predetermined length, is now inserted downwardly through the guide tube as seen at 37 to project from the lower end of the top mold 10. The dimensions of the tube O.D. and I.D. are such that the tube will fit snugly in the I.D. of the bore 12 with the I.D. of the tube fitting snugly over the O.D. of the rod 30. It is important that the tube 37 project a predetermined distance below the top mold 10. This predetermined distance can be obtained in several ways. When the operator inserts the tube, the operator can insure that the top of the tube is flush with the top of the guide tube 13 and pivoting the back stop 35 over the top of the tube gages the tube against such back stop. In this manner, the tube length may be gauged from the top end to project the predetermined distance noted. Alternatively, a gage bar, shown at 40 may be employed to contact the lower end of the tube to obtain the desired projection.

With the molds still in their intermediate position and the tube properly positioned and projecting from the top mold, the projecting end of the tube is now heated as seen in FIG. 3. The heating of the tube may be accomplished in a variety of ways. In FIG. 3, two heating blocks 42 and 43 are employed, each provided with electrical heating elements seen at 44 and 45, respectively, to confine the projecting end of the tube 37 therebetween. It will of course be appreciated that other forms of the application of heat may be employed such as sonics or a heating jacket employing oil or other heating medium.

The projecting end of the tube is heated for a predetermined length of time so that the projecting end of the tube is heated short of a complete melt, but sufficiently to make the material pliable enough to mold when the dies are brought together. While those skilled in the art are familiar with the temperatures of the heating blocks described in this operation (e.g., 600–900° F.), for illustrative purposes only, this temperature would be approximately 700° F.±25° F. for a time of between 10–30 seconds in the case of polyethylene, particularly a grade of polyethylene which has the characteristics of MDPE. The key is to balance the temperature and dwell time within the heating blocks. It is well within the skill of those in the art to vary the time and/or temperatures noted to achieve the desired degree of softness necessary for further processing. Stated alternatively, the key is the temperature to which the polymer wall is heated, so that it can be molded into an alternative configuration, i.e., reformed into a second shape (e.g., bulb) with memory to stay in this shape.

Figures 23, 24:
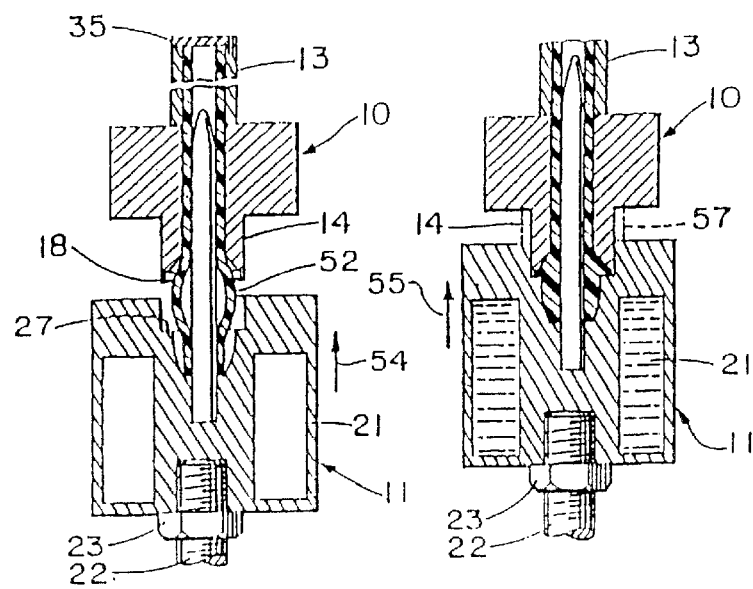
FIG. 23 is a view similar to FIGS. 20–22 showing the dies being brought together.
FIG. 24 is a view similar to FIG. 23 showing the dies closed.

After the desired amount of heat is applied, the heating blocks are removed. Depending upon the polymer and/or temperatures used, a cooling cycle may be employed before the initiation of the next step. If a bottom gage is employed, the gage 40 is also removed and the retractable step 33 is withdrawn. With the back stop 35 in place, the piston-cylinder assembly of the rod 22 is now further extended as seen in FIGS. 4 and 23 and the projecting end of the tube seats in the bottom face 29 of the bulb forming cavity 28 and begins to form as seen at 52. As the bottom mold moves upwardly as indicated by the arrows 54 and 55 in FIGS. 4 and 5 and FIGS. 23 and 24, respectively, the axial projection 14 of the top mold telescopes within the cylindrical recess 26 of the bottom mold. The bottom mold continues upwardly to the position shown in FIGS. 5 and 24, forming the tube end as indicated. During such movement, the back stop 35 keeps the tube from moving upwardly with respect to the top mold. The piston-cylinder assembly is fully extended until the edge 18 of the top mold engages the shoulder 27. Such edge will tend to bite off or render easily removable any flash formed between the telescoping surfaces of the molds. Alternatively, a stop or gage ring can be provided as seen at 57 to limit the relative movement of the molds to avoid wear on the edge 18. When the molds are fully together as seen in FIGS. 5 and 24, a cooling medium may be circulated through the passage 21 as seen at 58. While water is preferred, it will be appreciated that the cooling medium could be many other fluids such as oil or even a gas.

After the mold has been cooled for a predetermined time, the piston-cylinder assembly of the rod 22 is fully retracted and the top mold may be indexed horizontally so that the now formed tube may be removed. If any flash appears, it can be readily removed from the tube. While the discussion has focused on the top mold being of unitary construction, it is equally envisioned that a split mold could be employed. In this embodiment, the piston-cylinder assembly is fully retracted, the split halves of the top mold 10 would be opened and the part removed from the top mold in a vertical direction.

After the tube is removed, the top mold remains in alignment with the bottom mold and the stop 33 is returned to its position and the piston-cylinder assembly is extended to bring the molds back to the original FIG. 1 or 20 position so that the process may be repeated.

Any method of heating the polymer to this processing temperature is acceptable. Preferred is hot air heating where MDPE is positioned within a heating block. For example, if the heating block is at 900° F. and positioned ¼" from the tube, then the heating time would be less than 5 seconds. However, getting it this hot this fast, may not be efficient in the fabrication operation. Also, if a temperature of 320° F. is chosen for the heating blocks with the same ¼" distance from the tube, then it is still possible to heat the tube to the reforming temperature, except that the heating time has increased to approximately 60 seconds. Alternatively, if the tube is dipped into hot oil at 320° F. and heat the inner diameter and outer diameter of the tube simultaneously, it is possible to achieve reforming temperatures in approximately 8 seconds.

In one aspect of this invention, the tubes are pre-heated outside of the fabrication cycle. This allows a manufacturer to use a tube which is essentially almost completely ready to reform in the molding cycle which thereby decreases fabrication cycle time. If for example, the total molding cycle time is 30 seconds for heating, 5 seconds for molding and 10 seconds for cooling, it is possible to use a 10 or 20 second pre-heat to achieve essentially 60–80% of the molding temperature prior to introduction into the mold. In some specialized applications, it is possible to heat up to 100% of the reforming temperature, but this requires precise cycle time control.

Therefore, at least in one preferred aspect of the invention is the use of a profile heating means, e.g., heated mold or heated oven, which pre-heats at least a portion of the essentially linear profile to a temperature which is sufficient to permit bending (formability or plasticizing) of the profile, but not melt-processing of the profile. As used in this application, this initial temperature or first temperature, is one in which the profile still maintains at least a minimal degree of structural integrity, yet which is still pliable or formable, at least partially plasticized. Phrased alternatively, the modulus of elasticity of the polymeric profile is not so high so as to return to the original essentially linear profile after the externally applied bending force is removed. The polymer is fairly non-adherent, ductile, easily deformable, yet is still below the melt temperature of the polymer. The term second temperature, as used in the application means the temperature at which the profile becomes processable from an initial profile into a reshaped profile upon the application of heat and pressure. Often this temperature will be the temperature at which the polymer is melt-processable or essentially melt processable. At this temperature and upon the application of a sufficient amount of pressure the polymer is reformed from an initial shape and profile into a second shape and profile. It will be understood that as this second temperature approaches the melt temperature of the polymer, less pressure will be required to convert the profile from its initial shape into a second shape. In order to make this process commercially viable, both the initial profile is preheated as well as the profile heating means, e.g., mold. This enables cycle, times to be decreased. Additionally, by preheating the molds, it is possible to avoid the phenomenon of "freezing" which may occur in molding operations when the polymeric profile contacts the cold surface of a mold.

The process includes various steps, the first of which involves heating at least a portion of the extruded profile in a preheated profile heating means (e.g., heating mold or oven) to a first temperature at which the essentially linear profile becomes formable or pliable or bendable. The profile still has at least some degree of structural integrity at this point which permits it to be physically manipulated without compressing the profile by the application of external pressure or by the weight of gravity itself. This first temperature is less than a subsequent second temperature, at which the profile becomes melt processable effecting radial expansion under pressure or melt fusion under pressure. At least one end of the profile remains unheated.

The profile is then transferred into a heated die having a cavity therein, the cavity temperature being sufficient to heat the profile from the first temperature to the second temperature. The profile is cooled and removed from the die.

In one embodiment of the invention, the first temperature is greater than or equal to approximately 40° C. which is less than or equal to approximately 95% of said second temperature, the numeric value of this second temperature being dependent upon various factors, e.g., polymer, filler, additives, etc. In a more preferred embodiment, said first temperature is greater than or equal to approximately 65° C. and less than or equal to approximately 95% of the second temperature. Phrased somewhat differently and not identically, although similar in concept, a temperature difference between the first and second temperatures is between approximately 5 and 30% inclusive when compared to the second temperature. More preferably, this difference will be between approximately 8 and 15% inclusive. One of the key aspects of this invention is the recognition of the need to minimize the amount of heating necessary to increase the temperature of the profile from the first temperature to the second temperature, while still maintaining a sufficient degree of structural integrity of the profile so as to permit physical movement from the profile heating means into a heated die without a total collapse of the walls of the profile either due to gravity or to physical manipulation.

It will be appreciated that the tooling illustrated may be either horizontally or vertically oriented and that the recess configurations may be readily altered to form a belled end of varying configurations. Also, the tube holder 13 can be readily changed to accommodate tubes precut to different lengths. In practicing the process, it is important however, that the projecting heated end of the tube substantially conform to the volume of the mating recesses in the two dies or molds. Whether employed horizontally or vertically, the relatively fixed mold 10 may be termed the female mold while the moving mold 11 with the guide rod projecting therefrom and holding the I.D. of the tube may be termed the male mold or die.

The resultant project of the process of FIGS. 1–5 is seen in FIG. 6. The plastic tube thus formed includes an integrally formed belled end into which a suitably dimensioned copper fitting for example, could be inserted. The plastic tube thus formed, includes an integrally formed belled surface 60 extending from the end face 61 of the tube to conical neck 65. The end face 61 of the tube has both a larger I.D. and O.D. than the remainder of the tube, but the thickness of all portions of the tube are essentially the same.

As shown in FIG. 11, alternative mold designs are envisioned equally applicable to the process described previously. In discussing this alternative embodiment, like part numbers are referred to using the same reference numerals described previously. Similar, but modified parts are designated by the inclusion of a prime (') after the reference numeral. The device includes a top vertically moveable two-piece horizontally operating clamping die 9, a center vertically-fixed two-piece horizontally operating mold 10' and a vertically moveable bottom mold 11'. The clamping die 9 includes a central bore, the diameter of which is equal to a diameter sufficiently smaller than the diameter of the tube to be belled so as to cause a clamping effect on the tube when the clamp die 9 is closed.

The center vertically-fixed two-piece horizontally operating mold 10' includes a central bore, of the same diameter as the tube to be belled. The lower end of the bore is provided with a conical flaring portion 15', the lower end of which is of a diameter and length equal to the outside diameter and length of the belled end of the tube.

The bottom mold 11' includes a body 20' which may include an annular passage 21' for the circulation of a cooling medium therethrough. The body is threadedly connected to row 22 of a piston-cylinder assembly and adjustably locked thereto by nut 23. The bottom mold or die 11' is provided with a central recess shown generally at 25' into which the axial projection 14' of the top mold 10' is designed closely to telescope. Projecting from the bottom of the recess 25' is rod 30', the diameter of the rod at the bottom of the recess of equal diameter to the I.D. of the belled end of the tube and maintained for a distance equal to the depth of the tube bell. Rod 30' terminates at the top 31' and is radiused to corresponding conical flaring portion 15' at conical segment 32.

In sequenced operation and shown in successive Figures, this modified mold and die design is identical in concept, and implementation to that previously detailed and all related discussion is equally applicable to either embodiment. As shown in FIG. 12, plastic 37 is inserted through clamping mold 9 and top mold 10', resting on tube position stop 40. The two halves of the clamping mold 9 are closed thereby holding plastic 37 firm.

In FIG. 13, clamping mold 9 is moved to a position extending the lower end of the plastic 37 into a cavity in heating blocks 42. The split halves of center mold 10' are closed about the circumference of plastic body 37 during the heating cycle to provide stability to the tube during the heating cycle.

With the heating cycle completed, center mold 10' is opened and clamping mold 9 returned to its original disengaged position. The heated end of plastic 37 is now positioned in the belled cavity of center mold 10' as shown in FIG. 14. In FIG. 15, the center mold 10' has been closed about plastic 37 and bottom mold 11' has been moved upward with the pilot nose 31' of guide rod 30' penetrating the heated end of the tube.

In FIG. 16, bottom mold 11' is completely extended, forcing the heated plastic into the cavity created at the connection center mold 10' and bottom mold 11'. After a sufficient period of cooling, all molds are returned to their original positions and the belled tube is then removed from the molds.

FIG. 7 illustrates one embodiment of a completed plumbing connector 70 comprising a unitary molded end cap 80, nut 100 and belled end 75. The length of connector 70 is of any length and configuration. It may be straight or contain a myriad of bends and twists. What is critical however, is that subsequent to the formation of the end cap 80, the nut 100 is positioned onto the connector with the open face 92 of nut 100 facing toward the end cap 80. It is not possible to insert nut 100 subsequent to the belling step described previously.

Unitary molded end cap 80 comprises a sealing surface 84 extending from the end face 82 of the tube to radially extending flange 86. The sealing surface 84 may be radiused as indicated or it may be conical. The end face 82 of the tube has a slightly larger O.D. than the remainder of the tube so that the wall of the tube at the sealing surface is substantially enlarged throughout its length. The sealing surface terminates in the flange 86 which includes a stop face 85 adjacent the sealing surface and a shoulder 88 on the opposite side. From the shoulder to the O.D. of the tube, there is provided a fillet 90 which joins the flange spaced from the peripheral edge thereof with either a slight radius 65 as shown in FIG. 6 or a collar 90 as shown in FIG. 7.

Nut 100 which is inserted prior to the belling step, and after the formation of unitary molded end cap 80, is positioned onto connector 70 of diameter $d_1$ through nut opening 102 which is of larger diameter than $d_1$ but of smaller diameter than shoulder 86, with open face 92 positioned toward end cap 80. Nut 100 contains a threaded circular bore 104 of predetermined height 94 which is used to sealingly engage a mating threaded receiver (not shown). As nut 100 is tightened by a plurality of parallel-spaced ridges 96, end cap 80 is brought into leak-proof engagement with the threaded receiver by the top surface 98 of nut 100, through its engagement onto shoulder 88 of end cap 80 as best shown in FIG. 8. In one embodiment of this invention, shown only in FIG. 7, retaining ridges 99 are compression molded into the shaft of the tube, serving the purpose of retaining the nut 100 close to the molded end cap 80. Due to the flexible nature of the thermoplastic starting material, nut 100 is capable of being inserted over the retaining ridges 99 by the application of slight pressure. The precise positioning of the retaining ridges is not critical, but generally is in close proximity to the sealing end of the tube. The ridges are molded into the tubing design through a simple modification of the mold design used to fabricate the sealing end. The number of retaining ridges can be variable, being at least one, preferably at least two opposed nodules on the shaft of the tube. Higher number of retaining ridges are also envisioned with the scope of this invention, the number being dependent upon both cost and geometric space considerations. As the number of ridges increases, the geometry begins to look like a retaining ring, and in fact, this represents an outer limit as the number of retaining ridges increases.

Connector 70 is thus, of unitary construction, of original diameter $d_1$ and thickness t, which through the process of heating and molding into an appropriately configured die, is shaped into end cap 80, still of diameter $d_1$. After insertion of nut 100, and subsequent heating of an opposed end to end cap 80 of connector 70, followed by molding into a second appropriately configured die, belled end 75 is fabricated of larger diameter $d_2$, but still of thickness t.

Figure 26:
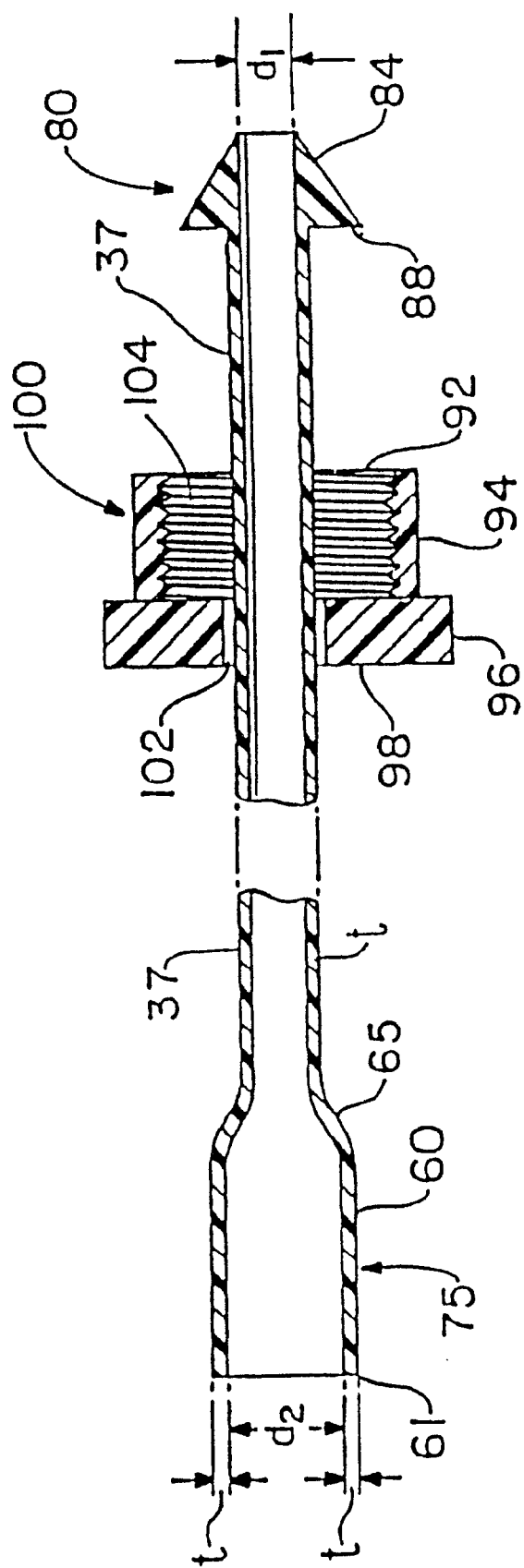
FIG. 26 is an enlarged cross-sectional view of an alternative embodiment of the sealing end of the tubing connector.

As shown in FIG. 26, in yet another alternative embodiment of this invention, unitary molded end cap 80' comprises a sealing surface 84 extending from the end of the tube, thereby eliminating, or at least minimizing end face 82 of the tube, and terminating at shoulder 88. This configuration eliminates the need for radially extending flange 86 and/or optional stop face 85. It is recognized that the angle which is formed between the longitudinal axis of the connector 37 and an axis which is formed by along sealing surface 84 can range between from about 10 and 80°, preferably between 20 and 70°, and more preferably between 30 and 60° when the material of construction is either polypropylene or crosslinked polyethylene.

As shown in FIG. 9, the plumbing connector 70 need not be in a linear configuration along a longitudinal axis of the connector. In fact, non-linear configurations are well-within the scope of this invention. Such bends within the connector can be: (1) permanent, the result of post fabrication techniques, such as mild, fairly localized heating to a softening point of the material, followed by bending and molding within a fixture that will hold the desired angle and radius, followed by cooling, and other processes which are known-in-the-art, or (2) non-permanent.

While the plumbing connector wall thickness t, has been shown to be the same throughout, the application is not necessarily limited to such. As shown in FIG. 10, it is possible to fabricate plumbing connector 70 wherein the wall thickness t' is greater than that of the mid-portion of the tube 37. In other words, t'>t. Such a configuration is made by increasing the thickness of the die cavity containing circular bulb forming cavity 28. As discussed previously in relation to a constant wall thickness t, thickness t' will require that tube 37 project an even longer distance below top mold 10 than used when thickness t is desired. This is necessary such that subsequent to the softening of the projecting end of the tube 37 via the action of heating blocks 42 and 43, or other heating means, and the dies have been brought together, the larger die void, i.e., bulb forming cavity 28 will be filled with polymer.

While unitary molded end cap 80 has been previously prepared, it is not limited in shape to such. It should be recognized that while a molded end cap such as that shown in FIGS. 7–10 may be highly desirable when using polybutylene, other polymers possess different sealing characteristics. In some instances, it is preferable to switch to a different mold design for the moded end cap, such as to produce a tubing end 110 as shown in FIG. 17, wherein a constant diametered $d_1$ tube is shown having a tubing wall thickness t and a nose cone shelf 106 projecting essentially normal to the longitudinal axis of the tubing as shown. The sealing bulb 108, shown in cross-section, is a separate insert which seats itself onto one side of the nose cone shelf 106, and is typically made of a rubber polymer, e.g., EPDM, neoprene, TPR, TPE, etc.) which effects a leak-tight seal.

Figure 18:
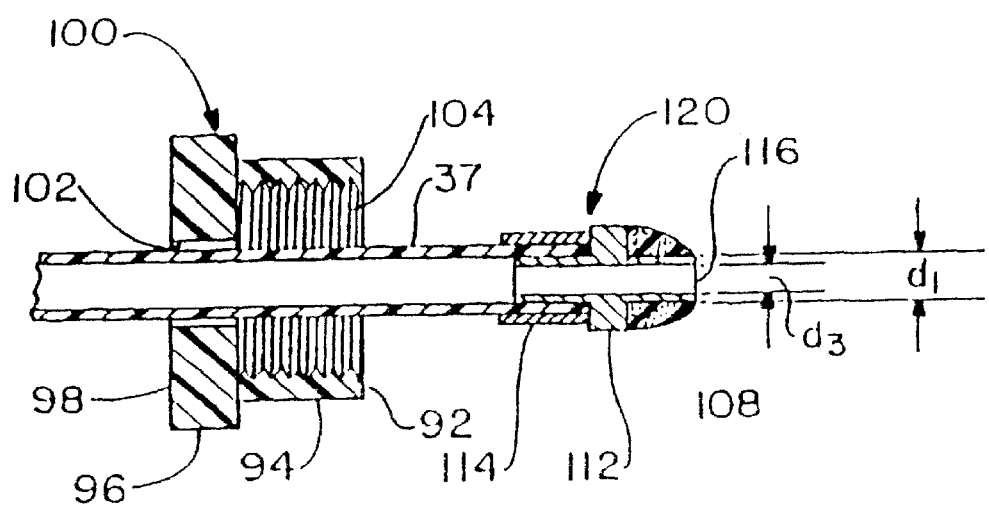
FIG. 18 is an enlarged cross-sectional view of a prior art tubing connector.

The tubing end shown in FIG. 17 is distinct when contrasted to the design which the. Prior Art has been using as shown in FIG. 18. The nose cone shelf 112 is actually a component of a metal insert 116 which is held into place via metallic or plastic ring 114 which is compression fit (crimped) or shrunk onto the exterior of the tube. The metal insert 116 is of diameter $d_3$ which is of slightly smaller I.D. than the original tube I.D. $d_2$. This Prior Art product is inherently weaker than a molded end cap as any crimped fitting potentially can separate leading to field failure.

Figure 19:
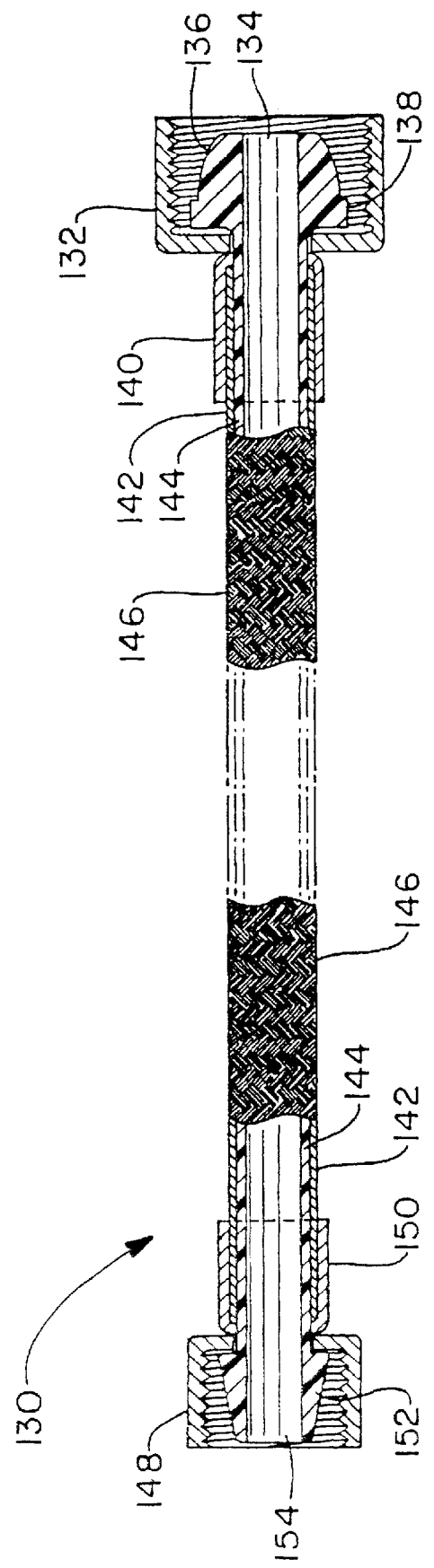
FIG. 19 is a side view shown in partial cross-section showing a tubing connector having both a radiused and a conical sealing means with a stainless steel overbraid.
Figure 25:
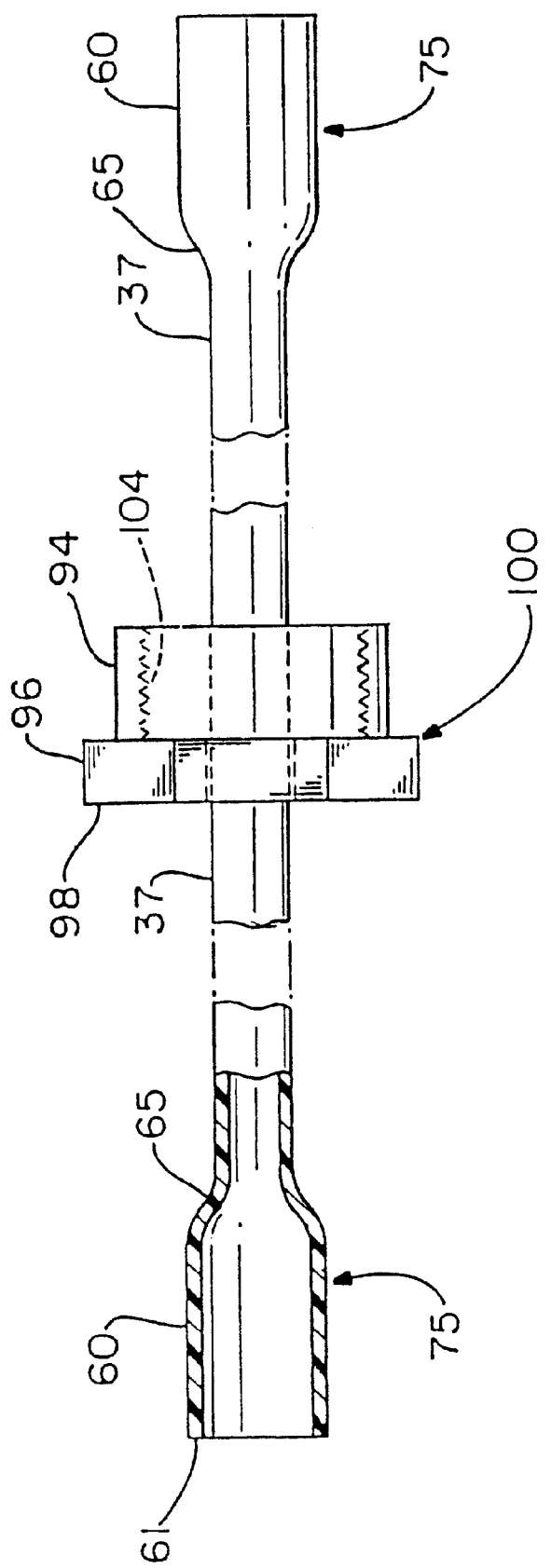
FIG. 25 is an enlarged partial cross-sectional view of a connector having two belled ends.

While the tubing connectors have generally been shown having one molded end and one belled end, there is no need to limit the invention to such. In fact, depending on the application, it may be highly desirable to have two molded ends 130 as shown in FIG. 19 or two belled ends as shown in FIG. 25. Connector 130 is an example of a connector with two molded ends 134, 154, one end being radiused 136 and having a shelf 138 with the other end being conical 152. The connector is of a multi-layered construction having an internal crosslinked thermoplastic layer 142, with a stainless steel or mesh overbraid layer 146 attached to the conical end via metallic ring 150. Each end further contains an attachment means 132, 148, in this example, being a threadably engageable nut.

While crosslinked polyethylene has been used in many current applications, not all end uses require the degree of stiffness which is present in this material, nor the mechanical properties pertinent to strength. For many applications where wide temperature variations are not present, or where the use temperature is not extreme, or where the pressure requirements of the system are fairly modest, medium density polyethylene is suitable as the material of choice. This is particularly true for example, in cold water filter inlet lines typically found on most refrigerators today. MDPE has a density which can range from about 0.926 g/cc to 0.940 g/cc; a tensile strength ranging from about 17–25 MPa; a Vicat softening point of from about 80–120° C.; a flexural modulus of 110,000 psi; and a melting point of from about 120–130° C. Alternatively, the material used in the application can be a blend of both high and low density polyethylene so as to achieve the overall characteristics of MDPE. LDPE can have a density ranging from about 0.910 g/cc to 0.925 g/cc; a tensile strength ranging from about 10–15 MPa; a Vicat softening point of from about 90–120° C.; a flexural modulus of 90,000 psi; and a melting point of about 110° C. HDPE can have a density ranging from about 0.940+g/cc to 1.0 g/cc; a tensile strength ranging of from about 10 to 30 MPa; a Vicat softening point of from about 100–130° C.; a flexural modulus of 125,000 psi; and a melting point of about 130° C. Crosslinked polyethylene typically has a flexural modulus of 140,000 psi for comparative purposes.

The flexural modulus of crosslinked polyethylene is roughly 28% higher than that of medium density polyethylene. This directly relates to an increase in the hoop strength of a tubing made from the two materials. The hoop strength can affect a refrigerator water filter or ice cube maker inlet connection in several ways, with at least one important one being coiling. The higher the hoop strength, the more difficult it is to put the tubing into a tight coil. Also, the tendency to uncoil is greater in a tubing with a high hoop strength.

When MDPE or a blend of polymers which give blended properties essentially equivalent to those of MDPE homopolymers are used, the geometry of the sealing bulb is typically modified so as to accommodate the decreased rigidity which the plumbing industry has come to associate with either crosslinked polyethylene or polypropylene. As illustrated in FIG. 27 in a preferred embodiment, the L/D (length/diameter) ratio for the bulb 80" is greater than 1.0 whereas in plumbing applications using crosslinked polyethylene, this same ratio is typically less than 1.0. The value in having this ratio greater than 1 resides in the increased structural integrity which is accorded to the piece by having a greater penetration depth of the bulb into the receiving piece (not shown). As lateral expansion forces radially increase the pressure within the bulb, the increased surface area contact with the vertical walls of the receiving piece, permits the MDPE with inferior physical properties (e.g., less stiffness and more creep), to perform under conditions where the MDPE piece would have been expected to fail. FIG. 28 illustrates an alternative embodiment of FIG. 27 wherein flange 86 is illustrated.

It is recognized that an angle a which is formed between the longitudinal axis of the connector 37 and a line which is formed along sealing surface 84 coplanar with the longitudinal axis can range between from about 5 and 45° inclusive, preferably between 10 and 37°, and more preferably between 15 and 30° when the material of construction is MDPE.

DISCUSSION

The plumbing industry has undergone a shift in plumbing materials over the past ten years from polybutylene, to crosslinked polyethylene, to polypropylene, and now to medium density polyethylene, optionally, with low levels of crosslinking, e.g., 30% or less, more preferably 20% or less, and most preferably, 10% or less for cold water, low pressure applications. Crosslinked polyethylene will produce a product which has an expected service life of 30 years or more under normal operations. Recently, manufacturers have been interested in using a less expensive material for less critical applications, and also a desire to increase flexibility. This is most apparent in refrigeration cold water supplies that are used for low pressure applications such as water filter kits or ice maker book up kits. Depending on the application, the material density of the polyethylene can be reduced as low as 0.926 and the crosslinking percentage also reduced. In certain applications, the crosslinking may not be needed if the nut and the receiver design are robust enough to not leak when a non-crosslinked bulb and tube is used.

The lower the density of the polyethylene, the more flexible the tube is. It also has lower heat distortion, shorter life expectancy poorer creep performance and more notch sensitivity. New developments in technology now are allowing the use of lower density materials with lower amounts of crosslinking to achieve a tube and connector that are more economical for less critical applications. Special cases, e.g., cold water, robust fittings, tubes not formed in place, can allow the use of densities down to 0.926 with essentially no crosslinking. Through these improvements, new fitting technology and newer refrigeration designs, it is possible to shift from crosslinked polyethylene materials having a density of 0.940+g/cc to lower density materials such as 0.926 g/cc as well as decreasing the crosslinking percentage from 65% plus to 10% or less, preferably close to 0% crosslinking.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A medium density polyethylene connector which comprises
    (a) a tubular segment, said tubular segment comprising
        (i) a first inner diameter,
        (ii) a first outer diameter,
        (iii) a tubular segment thickness, said thickness being a difference between the first outer diameter and first inner diameter;
    (b) at least one integrally formed end cap on at least one end of the tubular segment, said end cap having a centrally disposed bore therethrough and comprising
        (i) a sealing surface on the end cap, and
        (ii) a shoulder which terminates the sealing surface, and wherein the bore inner diameter is the same as the first inner diameter;
    (c) a ratio of a length of the sealing means (L) to the shoulder diameter (D) is greater than 1; and
    (d) an angle α formed by an intersection of
        (i) a longitudinal axis of said connector and
        (ii) a line formed along said sealing surface coplanar with said longitudinal axis ranges from about 15 to 30° inclusive.

2. The connector of claim 1 wherein
    (a) the medium density polyethylene having a density range of from about 0.926 g/cc to 0.940 g/cc inclusive.

3. The connector of claim 1 wherein the medium density polyethylene comprises
    (a) a blend of low density polyethylene and high density polyethylene.

4. The connector of claim 3 wherein
said polyethylene having a flexural modulus of at least about 110,000 psi inclusive.

5. The connector of claim 1 which further comprises
    (a) an end face.

6. The connector of claim 5 which further comprises
    (a) a flange between the shoulder and the sealing surface.

7. The connector of claim 6 wherein the end cap further comprises
    (a) a stop face between the sealing means and the flange.

8. The connector of claim 1 which further comprises
    (a) a fastening means.

9. The connector of claim 1 wherein
    (a) when said connector is crosslinked, said connector has a degree of crosslinking that is less than or equal to 10%.

10. The connector of claim 1 wherein
    (a) said connector has essentially no crosslinking.

* * * * *